US005281905A

United States Patent [19]

Dhyanchand et al.

[11] Patent Number: 5,281,905

[45] Date of Patent: Jan. 25, 1994

[54] INDUCTION MACHINE BASED HYBRID AIRCRAFT ENGINE STARTING/GENERATING POWER SYSTEM

[75] Inventors: P. John Dhyanchand; Vietson Nguyen, both of Rockford, Ill.

[73] Assignee: Sundstrand Corporation, Rockford, Ill.

[21] Appl. No.: 450,643

[22] Filed: Dec. 14, 1989

[51] Int. Cl.[5] .......... H02P 3/00

[52] U.S. Cl. .......... 322/32; 322/90; 322/10; 322/29; 290/6; 290/38 R

[58] Field of Search .......... 322/8, 10, 11, 12, 28, 322/29, 32, 47; 290/6, 32, 38 R, 52, 46

[56] References Cited

U.S. PATENT DOCUMENTS

| | | | |
|---|---|---|---|
| 3,267,353 | 8/1966 | Franklin | 322/90 |
| 4,330,743 | 5/1982 | Glennon | 322/10 |
| 4,401,938 | 8/1983 | Cronin | 322/29 |
| 4,447,737 | 5/1984 | Cronin | 290/6 X |
| 4,488,053 | 12/1984 | Cronin | 290/6 X |
| 4,684,873 | 8/1987 | Glennon | 290/6 X |
| 4,830,412 | 5/1989 | Raad et al. | 290/38 R X |
| 4,883,973 | 11/1989 | Lakey et al. | 322/29 X |
| 4,908,565 | 3/1990 | Cook et al. | 322/10 |

*Primary Examiner*—David C. Cain

*Attorney, Agent, or Firm*—Marshall, O'Toole, Gerstein, Murray & Borun

[57] ABSTRACT

This invention relates to a hybrid AC/DC power source for aircraft power generation and aircraft engine starting. The power source employs an induction motor/generator and a converter for converting high frequency AC power into separate DC and low frequency AC power for use by aircraft electrical systems. The subject invention contemplates the provision of a driver for the motor/generator comprising a circuit for providing excitation to the motor/generator when it is operating as a generator, the circuit also converting AC power produced by the generator into the high frequency AC power for use by the converter. The converter comprises a first rectifier which produces the DC power and a second rectifier and an inverter which together produce the low frequency AC power. The generator produces uncontrolled frequency AC power. Bidirectional switches operate within the circuit to invert DC excitation power to produce power for the AC excitation and to rectify output of the generator into DC. The generator can function as an induction motor to provide motive power to start the aircraft engine. Either external DC power can provide power to the induction motor via the circuit or external AC power can provide power to the induction motor via the circuit.

20 Claims, 5 Drawing Sheets

FIGURE I

INDUCTION MACHINE BASED HYBRID AIRCRAFT ENGINE STARTING/GENERATING POWER SYSTEM

TECHNICAL FIELD

This invention relates to use of an induction machine as a motor/generator in a hybrid aircraft power system which allows the machine to act as a generator to supply both AC and DC power via a high frequency AC link and as a motor to accept power from both AC and DC external power sources to start an aircraft engine.

BACKGROUND ART

An induction motor/generator is an extremely durable and reliable energy conversion apparatus. Because of these attributes, manufacturers of aircraft electrical power systems have strived for years to make the induction motor/generator a part of an overall hybrid electrical power generating and aircraft engine starting system. A myriad of problems have stood in the way of accomplishing this feat, however. Specifically, since an induction generator requires excitation from an external source in order to function, provision of excitation has been a problem.

U.S. Pat. No. 4,447,737, which issued on May 8, 1984 to Cronin, is directed to a solution for providing excitation for an induction generator used in an aircraft electrical power system. Cronin is directed to a combination induction generator/synchronous generator power system. The power system includes an induction generator and a tandem generator enclosed in a single housing. The tandem generator includes a tandem synchronous generator which optionally excites the induction generator or provides power to the aircraft systems upon activation of a three-phase contactor. The tandem generator also includes a tandem synchronous generator which produces, via a phase controlled rectifier bridge, 270 volt DC power for the aircraft systems.

Apparently, Cronin addresses a two level system whereby a synchronous generator is employed when aircraft electrical loads are relatively minor. When aircraft electrical loads are larger, the synchronous generator is used as an exciter for an induction generator, which then supplies power to the larger loads. If DC output is desired, it is taken directly from a second synchronous generator.

As Cronin reveals, it is desirable to provide aircraft systems which are capable of producing both AC and DC. Cronin uses separate generators to produce AC and DC because an integrated system (one which employs a single generator as a source for both AC and DC power) has traditionally been subject to distortion due to AC and DC interaction.

In a similar vein is an apparatus described in U.S. Pat. No. 4,684,873, which issued on Aug. 4, 1987 to Glennon, directed to a hybrid generating system comprising an AC power generating section driven by a prime mover for generating AC output power and a DC power generating section independent of the AC power generating section, also driven by the prime mover for generating the DC output power. Each of the AC and DC power generating sections includes a permanent magnet generator. Glennon teaches full separation of AC and DC power sources, because, in the past, DC power provided by integrated systems has had less than desirable reliability. AC power produced by such integrated systems has been distorted because of rectification of a part of the AC power to produce the DC power. Such integrated hybrid systems have suffered from reduced efficiency.

In a related case, U.S Pat. No. 3,267,353, which issued on Aug. 16, 1966 to Franklin, is directed to a duplex generator system and more particularly to such a system for providing independently regulated alternating current and direct current output. Franklin notes that it has not been found practical in the past to utilize a single regulated alternating current source and rectify and regulate a portion of the power to provide a direct current source, since rectification of a part of the power results in substantial distortion in the alternating current wave shape. Franklin asserts that two completely separate generating systems would provide the independently regulated sources without wave shape distortion, but obviously such separate systems would be more expensive than a single combined magnetic structure.

Along similar lines, U.S. Pat. No. 4,330,743, which issued on May 18, 1982 to Glennon, and is commonly assigned with the subject invention, is directed to an electrical aircraft engine start and generating system for use in an aircraft having an engine driven torque converter coupled to an alternator which provides AC power for conversion to DC and AC power. This system includes a reversible AC to DC converter controllably electrically coupled to the alternator and a controller unit to provide DC power in a generating mode. The reversible AC to DC converter is capable of receiving externally supplied DC power to be converted to AC power to drive the alternator as a motor in start mode. A DC to AC converter is controllably electrically coupled to the controller unit and to the DC power output during the generating mode. The reversible DC to AC converter in the start mode is mutually controllably electrically coupled to the externally supplied DC power. The controller unit and the alternator cooperate to provide a controlled AC power output to be delivered to the alternator to bring the alternator operating as a motor up to operating speed, whereupon the reversible DC to AC converter responds to the external DC power and is electrically coupled to the alternator to drive the alternator as a motor to deliver rotary power through the torque converter to start the aircraft engine.

The subject invention differs from that disclosed in Glennon in two material respects. First, Glennon employs a constant speed drive between a variable speed aircraft engine and the alternator/motor. The constant speed drive drives the alternator/motor at a constant speed. Because the alternator/motor is driven in a constant speed, a high frequency AC link between the alternator/motor and the hybrid AC/DC converter is not needed. Second, Glennon is directed to use of a synchronous alternator/motor, wherein a more rugged and dependable induction motor/generator is used in the subject invention. In essence, the subject invention represents an evolutionary step over the invention found in Glennon.

Recent improvements in computer controlled solid state power conversion systems have allowed advances to occur in power conversion which now make an induction generator an appropriate source of power for an integrated hybrid AC/DC aircraft electrical power system. An integrated system employing an induction generator as its power source would enjoy benefits from vastly increased simplicity, reliability and ruggedness of the generator and would allow multiple forms of electrical energy to be derived from the system without requiring duplication of elements therein.

Accordingly, subject invention is the first to employ an induction generator as the heart of an integrated hybrid AC/DC electrical power generating system. Further, the subject invention employs the induction generator as a motor to allow starting of an aircraft engine by either an external AC and DC power source.

DISCLOSURE OF INVENTION

It is therefore a primary object of the subject invention to provide a hybrid AC/DC power source comprising a generation apparatus for creating high frequency AC power, said generation apparatus including an AC-excited induction generator producing uncontrolled frequency AC power and a converter for converting the high frequency AC power into separate DC and low frequency AC power sources for use by electrical loads to thereby allow an induction generator simultaneously to supply both DC and AC power.

Another object of the invention is to provide a hybrid AC/DC power source wherein a generation apparatus comprises a circuit for providing AC excitation to a generator, the circuit also converting AC power produced by the generator into high frequency power for use by a converter.

Still another object of the invention is to provide a hybrid AC/DC power source wherein a converter comprises a first rectifier which produces DC power.

A still further object of the invention is to provide a hybrid AC/DC power source wherein a converter comprises a second rectifier and an inverter which together produce low frequency AC power.

Yet a further object of the invention is to provide a hybrid AC/DC power source wherein a generator produces three phase uncontrolled frequency AC power.

Yet another object of the invention is to provide a hybrid AC/DC power source wherein a circuit comprises a plurality of bidirectional switches.

Still another object of the invention is to provide a hybrid AC/DC power source wherein DC excitation power is fed to a circuit, the circuit inverting the DC excitation power to produce power for AC excitation.

Still a further object of the invention is to provide a hybrid AC/DC power source wherein a generator can function as an induction motor to provide mechanical power.

A still further object of the invention is to provide a hybrid AC/DC power source wherein external DC power can supply power to an induction motor via a circuit.

Still another object of the invention is to provide a hybrid AC/DC power source wherein external AC power can provide power to an induction motor via a circuit.

A final object of this invention is to provide a method for producing hybrid AC/DC power, comprising the steps of producing uncontrolled frequency AC power by means of an induction generator, converting the uncontrolled frequency AC power into high frequency AC power and simultaneously producing both DC and lower frequency AC power from the high frequency AC power.

In the attainment of the foregoing objects, the apparatus that encompasses the preferred embodiment of the invention is a hybrid AC/DC power source having an induction generator and a converter for converting high frequency AC power into separate DC and low frequency AC power. The subject invention contemplates the inclusion of a driver for the generator comprising a circuit for providing AC excitation to the generator, the circuit also converting AC power produced by the generator into the high frequency AC power for use by the converter. The converter comprises a first rectifier which produces the DC power. The converter further comprises a second rectifier and an inverter which together produce the low frequency AC power. The generator produces uncontrolled frequency AC power. The circuit comprises a plurality of bidirectional switches. DC excitation power is fed to the circuit, the circuit inverting the DC excitation power to produce power for the AC excitation.

The induction generator can function as an induction motor to provide motive power for engine starts. External DC power can provide power to the induction motor via the circuit. Alternatively, external AC power can provide power to the induction motor via the circuit.

Other objects and advantages of the subject invention will be apparent upon reference to the accompanying description when taken in conjunction with the following drawings:

BEST MODE FOR CARRYING OUT INVENTION

Figure 1:
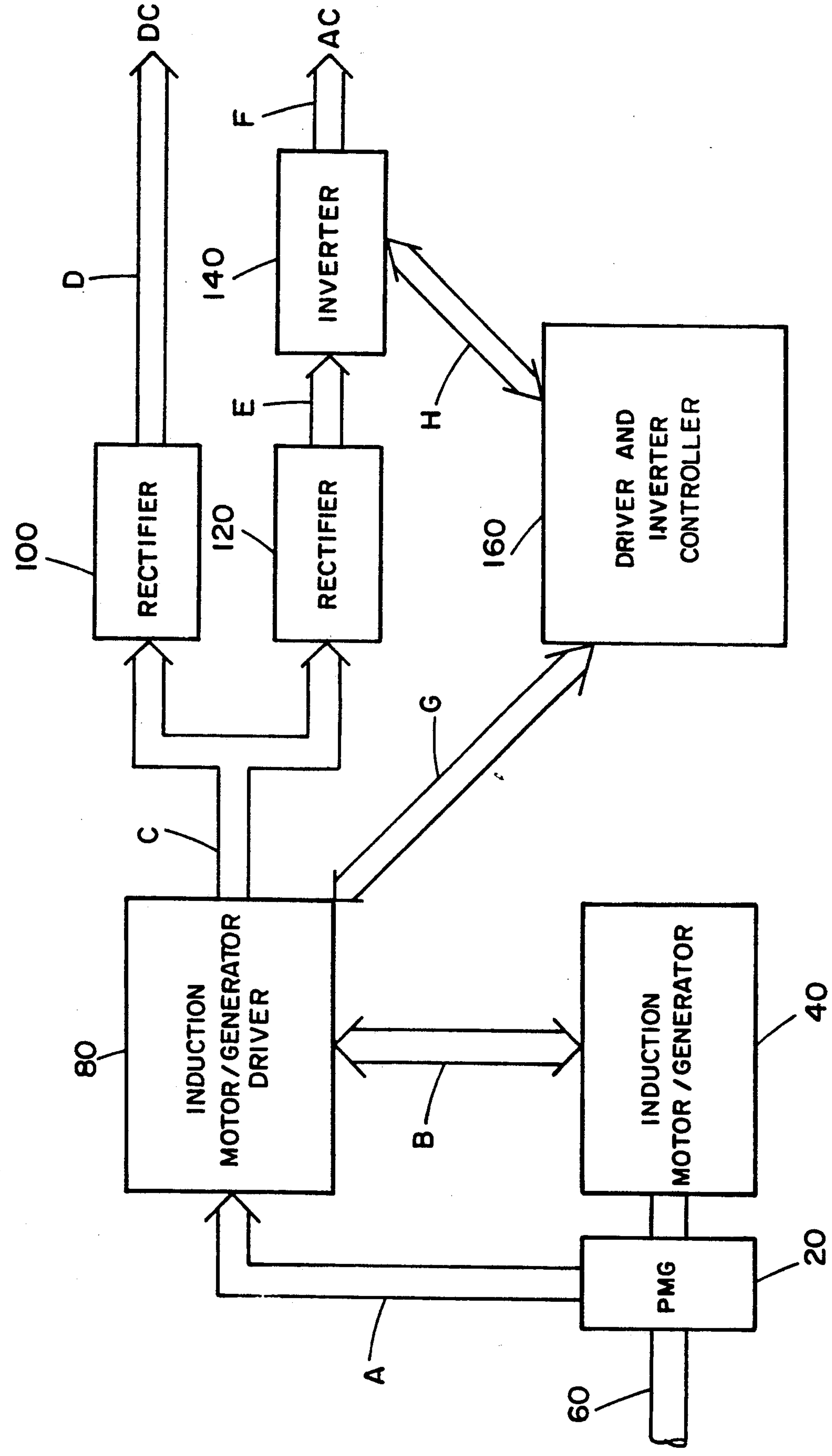
FIG. 1 is a block diagram of the hybrid AC/DC power system.

FIG. 1 is a block diagram of the hybrid AC/DC power system embodying the subject invention. A permanent magnet generator ("PMG") 20 and an induction motor/generator 40 are driven by a common input shaft 60 which, in turn, is driven by a prime mover (typically, an aircraft jet engine, not shown). An induction motor/generator driver 80 receives excitation power from the PMG 20, supplying that power to the induction motor/generator 40 which, because the induction motor/generator 40 is operating in a negative slip condition, amplifies the excitation being supplied, returning the amplified power back to the induction motor/generator driver 80. The induction motor/generator driver 80 produces high frequency AC power which is provided to a first rectifier 100 and a second rectifier 120. The first rectifier 100 is tapped directly to produce a DC output for use by aircraft DC electrical loads (not shown). The output of the second rectifier 120 is inverted in an inverter 140. Output from the inverter 140, in the form of constant frequency AC is fed to aircraft AC electrical loads (not shown). The induction motor/generator driver 80 and the inverter 140 are under control of a driver and inverter controller 160.

FIG. 1 has been supplied with a series of points, labeled "A" through "H". These points will be represented in later figures as inputs and outputs of the various elements represented in FIG. 1 and further explained.

Figure 2:
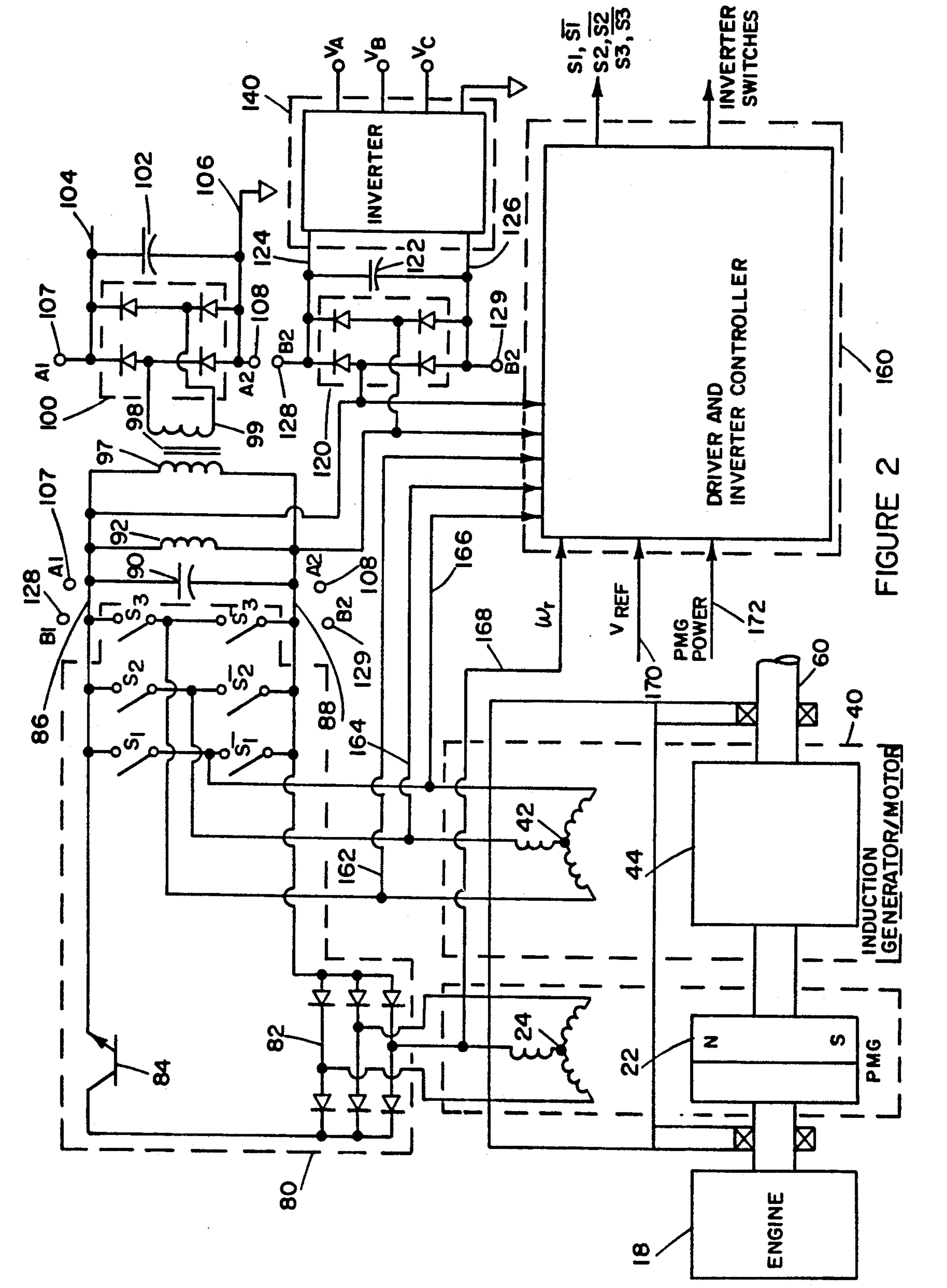
FIG. 2 is a schematic of the hybrid AC/DC power system.

FIG. 2 is a schematic of the hybrid AC/DC aircraft electrical power system as represented in block diagram form in FIG. 1. Elements which were represented in block diagram form have been outlined in dashed line in FIG. 2 and have like reference numerals.

An aircraft engine 18 drives a rotor shaft 60. A PMG rotor 22 is mounted to the rotor shaft 60 and is driven at a speed which varies as a function of the engine 18 speed. As the PMG rotor 22 turns, AC power is induced in three phase stator windings 24. The resulting three phase AC is rectified in a rectifier 82, which is a portion of the induction motor/generator driver 80. Output of the rectifier 82, of course, is in the form of DC power. When a switch 84 is closed, DC power from the rectifier 82 is delivered to a plurality of switches $S_1$, $S_2$, $S_3$, $S_1^-$, $S_2^-$, $S_3^-$. These switches, under control of the driver and inverter controller 160, invert the DC power output from the rectifier 82, delivering that power, which is now three phase AC power to a stator winding 42 of the induction motor/generator 40.

In order for the induction motor/generator 40 to act as a generator, it must be driven at higher than its synchronous speed, thereby causing a negative slip condition to exist in the induction motor/generator.

To do so, the switches $S_1$, $S_2$, $S_3$, $S_1^-$, $S_2^-$, $S_3^-$ switch the DC excitation power to create a field in the induction/motor generator 40 which rotates at a velocity less than that of the physical velocity of the induction motor/generator 40 rotor. In a negative slip condition, the induction motor/generator 40, which is now simply an induction generator, acts as a power amplifier, adding energy contained in its motion to excitation fed to it in the form of AC power delivered from the switches $S_1$, $S_2$, $S_3$, $S_1^-$, $S_2^-$, $S_3^-$. The manner in which an induction machine is driven as generator is known to those who are skilled in the art and thus will not be repeated at length here. U.S. Pat. No. 3,267,353 to Franklin contains a description of the operation of an induction generator and is incorporated herein by reference to provide an explanation of such operation.

Excitation power which was produced by the switches $S_1$, $S_2$, $S_3$, $S_1^-$, $S_2^-$, $S_3^-$ to the induction generator stator winding 42 and as amplified by an induction generator squirrel cage rotor 44 is delivered back to the induction motor/generator driver 80. The switches $S_1$l, $S_2$, $S_3$, $S_1^-$, $S_2^-$, $S_3^-$ within the driver 80 are bidirectional. That is, they accept current traveling both to and from the induction generator 40. Accordingly, under control of the driver and inverter controller 160, the switches $S_1$, $S_2$, $S_3$, $S_1^-$, $S_2^-$, $S_3^-$ are controlled to switch to produce DC waveform which, when modulated by a shunt capacitor 90 and inductor 92, produces a high frequency AC waveform which, in the preferred embodiment, is on the order of 20 KHz.

A 20 KHz AC waveform is highly desirable because inductance-based components which handle that frequency can be designed to be quite small. The 20 KHz waveform is supplied on a high frequency AC link, comprising a first rail 94 and a second rail 96. The first rail 94 and second rail 96 are provided to a primary winding 97 of a transformer 98. The transformer steps down the power of the 20 KHz waveform, supplying 191 volts on a secondary winding 99. Voltage from the secondary winding 99, still at 20 KHz, is supplied to the first rectifier 100 which, in combination with a smoothing shunt capacitor 102, produces 270 volt DC power on a positive rail 104 and a neutral rail 106 for use by DC-based electrical aircraft loads (not shown).

Since the aircraft electrical system shown in FIG. 2 is a hybrid AC/DC system, and is thus capable of producing AC and DC power simultaneously, 20 KHz power provided on rails 94 and 96 is likewise delivered to a second rectifier 120 which, in conjunction with a smoothing shunt capacitor 122, delivers 600 volt DC power to the inverter 140 on rails 124 and 126.

The inverter 140, under control of the driver and inverter controller 160, produces a constant frequency, three phase AC output at 115 volts for use by AC-based aircraft electrical loads (not shown). In the preferred embodiment, the inverter 140 is a summing transformer multistep inverter, the structure, function and characteristics of which are described in U.S Pat. No. 3,775,662, which issued on Nov. 27, 1973 to Compoly. The patent to Compoly is incorporated herein by reference.

In order to control the switches $S_1$, $S_2$, $S_3$, $S_1^-$, $S_2^-$, $S_3^-$ of the induction motor/generator driver 80 and switches within the inverter 140, the driver and inverter controller 160 derives current signals 162, 164, 166 from between the three phase induction generator stator winding 42 and the induction motor generator driver 80. In addition, voltages from the 20 KHz AC link rails 94 and 96 are obtained. The driver and inverter controller 160 receives a signal representing the rotational velocity of the input shaft 60, delivered on lead 168. Finally, the driver and inverter controller 160 receive a voltage reference 170 and power from the PMG 20, delivered on lead 172.

The hybrid power system as shown in FIG. 2 is provided with a pair of switches 86 and 88. The switches 86 and 88 are shown in a first position which allows power to be delivered from the induction motor/generator driver 80 to the first and second rectifiers 110, 120. The switches 86 and 88 have two alternative positions. In a first position A1 107 and A2 108, respectively, power may be delivered from an external source of DC power (not shown) to the positive and neutral DC rails 104, 106. This DC power is delivered to point Al 107 and point A2 108. As shown, the power is delivered from points A1 107 and A2 108 to the switches $S_1$, $S_2$, $S_3$, $S_1-$, $S_2-$, $S_3-$ which, under control of the driver and inverter controller 160, provide three phase AC power of variable frequency to the induction motor/generator stator winding 42 which forces the induction motor/-generator 40 to now be driven as a motor to start the engine 18.

Alternatively, using switch positions B1 128 and B2 129, an external source of three phase AC power can deliver the power to the inverter 140. The inverter 140, under control of the driver and inverter controller 160 can deliver DC power to points B1 128 and B2 129. The DC power is then delivered via the switches $S_1$, $S_2$, $S_3$, $S_1-$, $S_2-$, $S_3-$ to the induction motor/generator stator winding 42 in the form of three phase AC to effect starting of the engine 18 by driving the induction motor/generator 40 as a motor.

Switches $S_1$, $S_2$, $S_3$, $S_1-$, $S_2-$, $S_3-$ of FIG. 2 are each bidirectional switches. Further, switches in the inverter 140 are bidirectional.

Bidirectional switches are able to switch current traveling in any direction. The induction motor/generator driver 80 must use bidirectional switches because the induction motor/generator driver 80 must deliver excitation current to the induction motor/generator 40 and must accept output from the induction motor/generator 40 for delivery to the first and second rectifiers 100, 120. The inverter 140 must have bidirectional switches to allow current to travel from the second rectifier 120 therethrough to provide a constant frequency AC output and to allow an external AC source (not shown) to drive the induction motor/generator driver 80 through the inverter 140 when starting the engine 18.

Figure 3A:
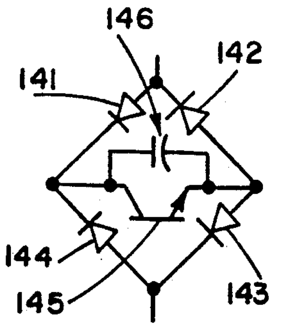
FIG. 3A illustrates a form of a bidirectional switch.

Accordingly, FIG. 3A shows a form of a bidirectional switch having a plurality of diodes 141, 142, 143, 144. The diodes 141, 142, 143, 144 are oriented in a bridge configuration so as to pass current through a power transistor 145 in a single direction. A shunt capacitor 146 is provided across the transistor 145.

Figure 3B:
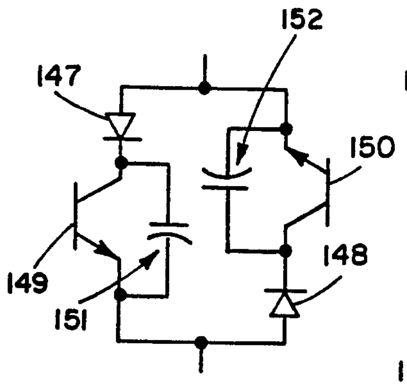
FIG. 3B illustrates an alternative form of a bidirectional switch.

FIG. 3 shows an alternative form of a bidirectional switch comprising diodes 147, 148 which are a series connected with transistors 149, 150. As in FIG. 3A, capacitors 151, 152 are provided across the transistors 149, 150, respectively.

Figure 3C:
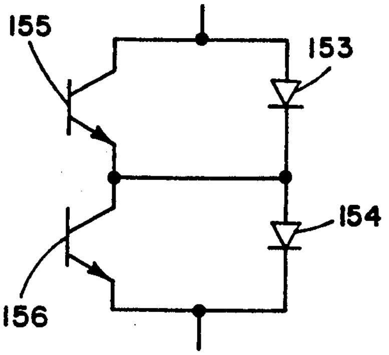
FIG. 3C illustrates another alternative form of a bidirectional switch.

FIG. 3C shows yet another alternative topology for a bidirectional switch. In this topology, there is provided a pair of diodes 153, 154 and a pair of transistors 155, 156. Again, current, irrespective of its direction, is oriented by the diodes 153, 154 to travel in a single direction through the transistors 155, 156.

Figure 4:
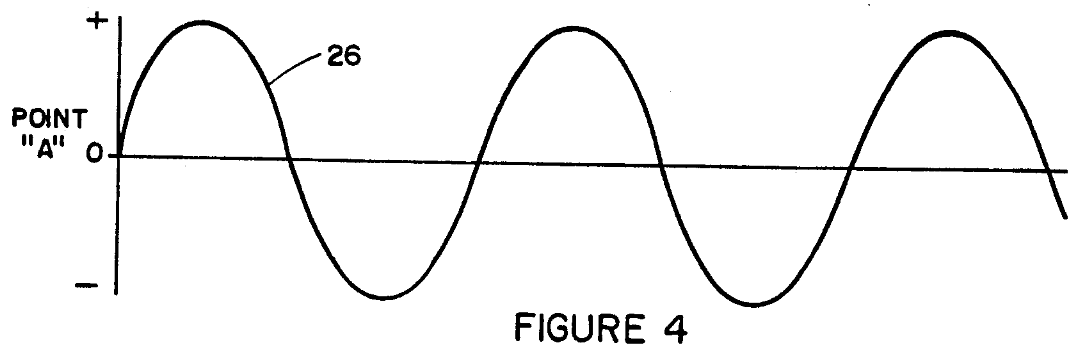
FIG. 4 represents output of a permanent magnet generator as taken at point "A" of FIG. 1.

FIG. 4 represents an uncontrolled frequency AC waveform taken at point "A" of FIG. 1 and produced by the PMG 20 of FIGS. 1 and 2. The waveform, designated 26, is of three phases in the preferred embodiment of the invention and is rectified in a rectifier 82 of FIG. 2 prior to being delivered to the induction motor/generator driver 80 of FIGS. 1 and 2.

Figure 5:
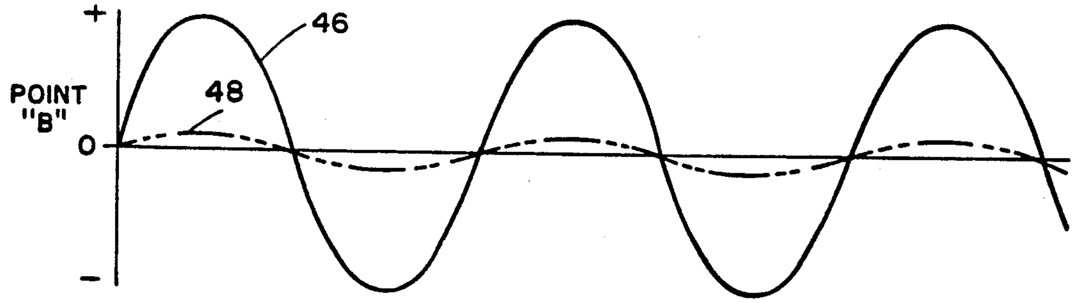
FIG. 5 represents of a waveform produced by an induction motor/generator driver operating in conjunction with an injunction motor/generator as taken at point "B" of FIG. 1.

FIG. 5 is a wild frequency AC waveform taken at point "B" of FIG. 1. The waveform, designated 46, actually comprises two waveforms superposed upon one another. A first waveform, designated 48, represents excitation produced by the induction motor/generator driver 80. Since the induction motor/generator 40 amplifies the waveform 48, there is a second component to the waveform 46, representing that amplification. The waveform 46 exists between the motor/generator driver 80 and the induction motor/generator 40 and further serves to excite the induction motor/generator 40. Switches $S_1$, $S_2$, $S_3$, $S_1-$, $S_2-$, $S_3-$ within the induction motor/generator driver 80 modulate the waveform 46 to produce a 20 KHz high frequency AC waveform.

Figure 6:
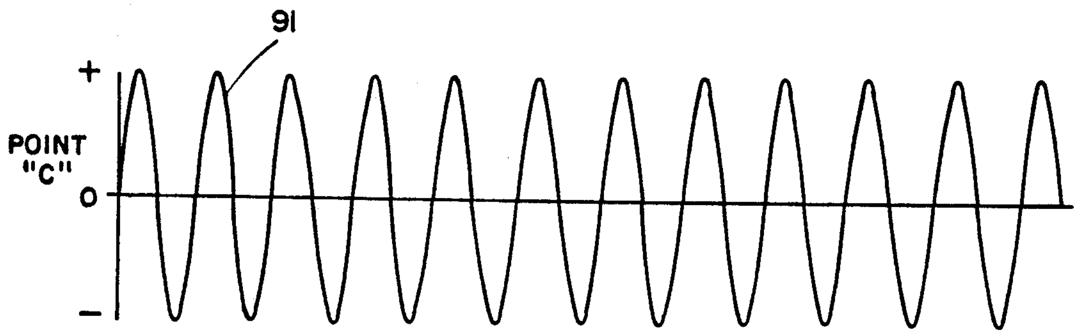
FIG. 6 represents a high frequency AC waveform as taken at point "C" of FIG. 1.

FIG. 6 shows that 20 KHz high frequency AC waveform, designated 91. Use of a high frequency waveform as a link in a power conversion system is advantageous because transformers and other inductance-based components downstream of the high frequency link may be advantageously sized to save weight and space. Further, because of the high frequency link, harmonic interference between 1) the first rectifier 100 and 2) the second rectifier 120 and inverter 140 acting together, is eliminated, due to the extremely high frequency of such interference and the ease with which such interference may be removed by filtering.

The waveform 91 is delivered to the first rectifier 100 and the second rectifier 120 to be rectified into respective DC waveforms.

Figure 7:
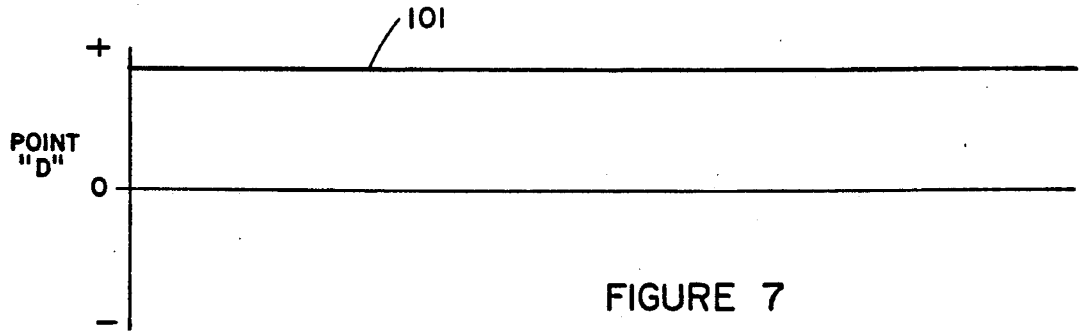
FIG. 7 represents a 270 VDC waveform as taken at point "D" of FIG. 1.

A first DC waveform shown in FIG. 7 is taken at point "D" of FIG. 1. The waveform, designated 101, is a relatively constant voltage waveform which is 270 VDC in the preferred embodiment of the invention. 270 volt DC is a standard aircraft DC voltage level and is useful for powering DC-based aircraft electrical loads (not shown).

Figure 8:
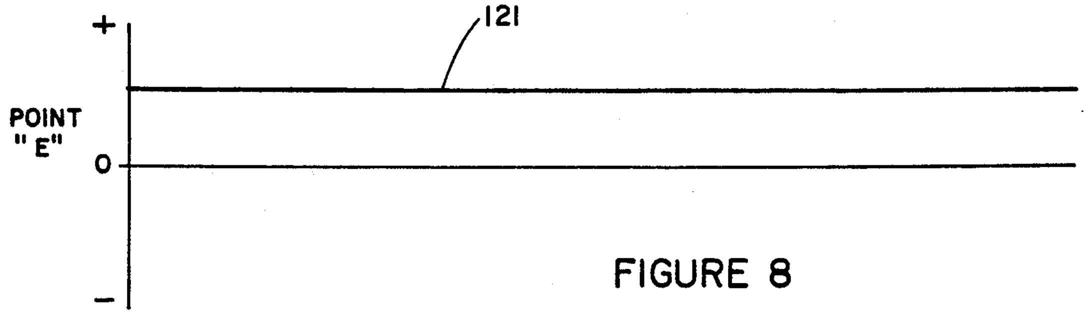
FIG. 8 represents a rectified 600 VDC waveform as taken at point "E" of FIG. 1.

FIG. 8 shows a waveform produced by the second rectifier 120 of FIG. 1 and 2 and taken at point "E" of FIG. 1. The waveform, designated 121, is, as the waveform in FIG. 7, a relatively constant voltage DC waveform which, in the preferred embodiment of the invention, is at 600 VDC. 600 VDC is chosen as the proper voltage for the waveform 121, because when 600 VDC is inverted into three phases, it produces 115 volt AC waveforms, which is the preferred AC output of a hybrid AC/DC aircraft power generating system.

Figure 9:
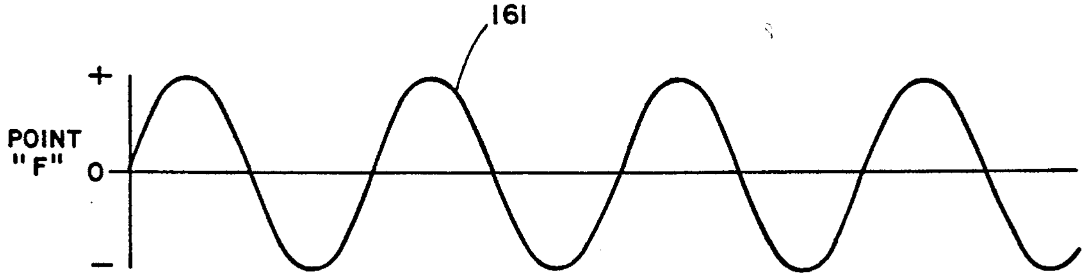
FIG. 9 represents the 600 VDC waveform of FIG. 8 as inverted to produce a constant frequency AC waveform as taken at point "F" of FIG. 1.

FIG. 9 shows a constant frequency 115 volt AC waveform, designated 161 (only a single phase is shown). The waveform 161 is produced by the inverter 140 after filtering, which inverter is of conventional design as previously discussed (although any DC to AC converter is within the scope of the subject invention). The waveform 161 is delivered via buses (not shown) to aircraft electrical loads (not shown) for consumption thereby.

Figure 10:
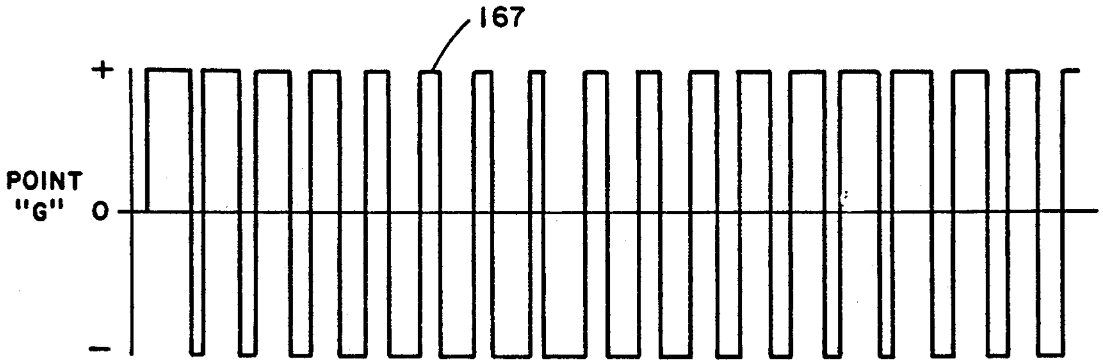
FIG. 10 represents an induction motor/generator driver PWM pattern supplied to a driver by an inverter controller taken at point "G" of FIG. 1.
Figure 11A:
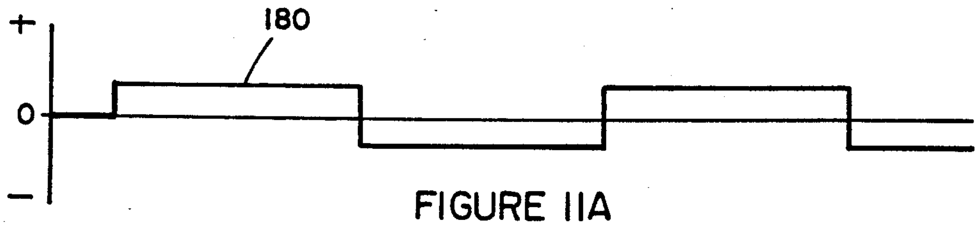
FIG. 11A represents part of an inverter control pattern supplied by a driver and inverter controller as taken at point "H" of FIG. 1.
Figure 11B:
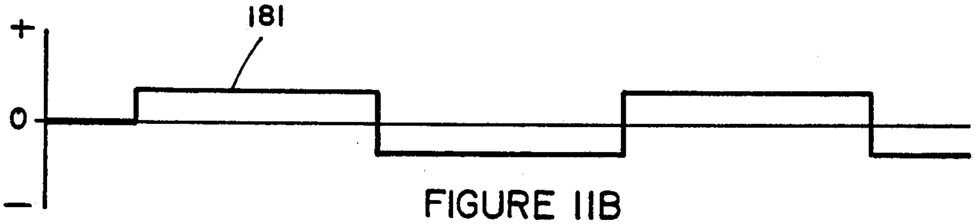
FIG. 11B represents another part of an inverter control pattern supplied by a driver and inverter controller as taken at point "H" of FIG. 1.
Figure 11C:
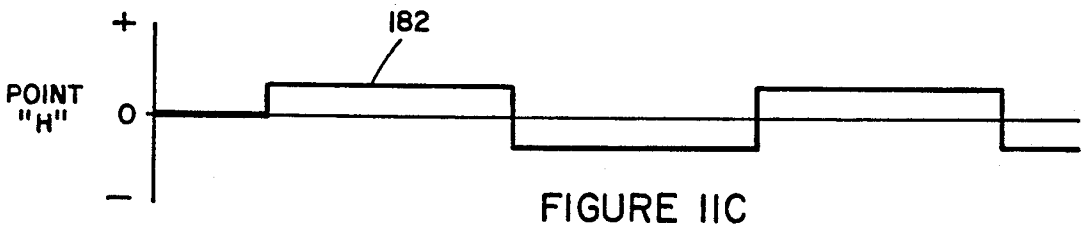
FIG. 11C represents still another part of an inverter control pattern supplied by a driver and inverter controller as taken at point "H" of FIG. 1.
Figure 11D:
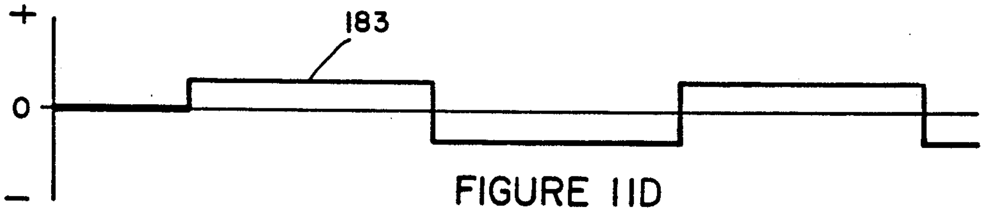
FIG. 11D represents part of an inverter control pattern supplied by a driver and inverter controller, taken at point "H" of FIG. 1.

FIG. 10 shows a waveform taken at point "G" of FIG. 1, representing a pulse width modulated ("PWM") waveform supplied by the driver and inverter controller 160 to the induction motor/generator driver 80 of FIG. 1. The PWM waveform, designated 167, comprises a series of switching transients defining pulses of varying widths. These switching transients are used to operate individual switches $S_1$, $S_2$, $S_3$, $S_1-$, $S_2-$, $S_3-$ in the induction motor/generator driver 80 to switch DC excitation produced by the rectifier 82 into AC excitation used by the induction motor/generator 40 and to switch AC generated by the induction motor/generator 40 into DC to be modulated by the shunt capacitor 90 and inductor 92 into the high frequency AC link waveform 91 of FIG. 6.

The driver and inverter controller 160 develops the PWM pattern 167 to ensure that the DC waveform provided the shunt capacitor 90 and inductor 92 is relatively pure.

FIGS. 11A through 11D illustrate switching patterns provided by the driver and inverter controller 160 to switches within the inverter 140, taken at point "H" of FIG. 1. These patterns, designated 180, 181, 182, 183, are used to control individual switches within the inverter 140, which is a multistep inverter in the preferred embodiment of the invention.

Figure 12:
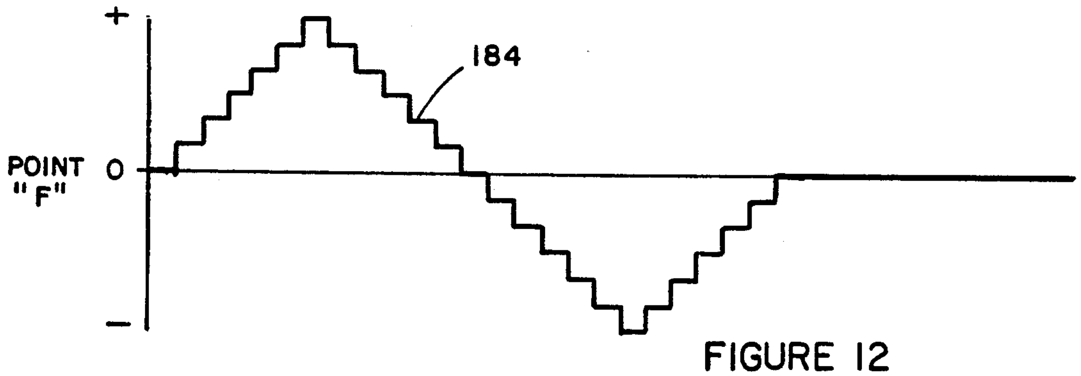
FIG. 12 represents a multistep waveform produced by an inverter under control of the inverter control patterns of FIGS. 11A through 11D, as taken at point "F" of FIG. 1.

FIG. 12 shows an unfiltered multistep waveform, designated 184, produced by the inverter 140 and taken at point "F" of FIG. 1. The multistep waveform is filtered by a filter (not shown) into the waveform 161 of FIG. 9. Again, in the preferred embodiment of the invention, the inverter 140 produces three multistep waveforms 184, which are offset by 120° with respect to one another to thereby provide a three phase 400 Hz AC output useful by AC-based aircraft electrical systems (not shown).

From the foregoing description, it is apparent that the invention described provides a novel hybrid AC/DC power source comprising a generation apparatus for creating high frequency AC power, the generation apparatus including an AC-excited induction generator producing wild frequency AC power and a converter for converting the high frequency AC power into separate DC and low frequency AC power sources for use by electrical loads to thereby allow an induction generator simultaneously to supply both DC and AC power.

Although this invention has been illustrated and described in connection with the particular embodiment illustrated, it will be apparent to those skilled in the art that various changes may be made therein without departing from the spirit of the invention as set forth in the appended claims.

I claim:

1. A hybrid AC/DC power source, comprising:

generation means for creating high frequency AC power, said generation means including an AC-excited induction generator producing uncontrolled frequency AC power; and converter means for converting said high frequency AC power into separate DC and low frequency AC power for use by electrical loads said converter means providing said AC excitation, to thereby allow an induction generation to supply both DC and AC power.

2. The power source as recited in claim 1 wherein said generation means comprises a circuit for providing AC excitation to said generator, said circuit also converting AC power produced by said generator into said high frequency power for use by said converter means.

3. The power source as recited in claim 2 wherein said converter means comprises a first rectifier which produces said DC power.

4. The power source as recited in claim 3 wherein said converter means comprises a second rectifier and an inverter which together produce said low frequency AC power.

5. The power source as recited in claim 4 wherein said generator produces three phase uncontrolled frequency AC power.

6. The power source as recited in claim 5 wherein said circuit comprises a plurality of bidirectional switches.

7. The power source as recited in claim 6 wherein power is fed to said circuit, said circuit converting said power into power for said AC excitation.

8. The power source as recited in claim 7 wherein said generator can function as an induction motor to thereby provide mechanical power.

9. The power source as recited in claim 8 wherein an external DC power can supply power to said induction motor via said circuit.

10. The power source as recited in claim 9 wherein external AC power can provide power to said induction motor via said circuit.

11. In a hybrid AC/DC power source having an induction generator and converter means for converting high frequency AC power into separate DC and low frequency AC power, a driver for said generator, comprising:

a circuit for providing AC excitation to said generator, said circuit also converting AC power produced by said generator into said high frequency AC power for use by said converter means.

12. The power source as recited in claim 11 wherein said converter means comprises a first rectifier which produces said DC power.

13. The power source as recited in claim 12 wherein said converter means comprises a second rectifier and an inverter which together produce said low frequency AC power.

14. The power source as recited in claim 13 wherein said generator produces uncontrolled frequency AC power.

15. The power source as recited in claim 14 wherein said circuit comprises a plurality of bidirectional switches.

16. The power source as recited in claim 15 wherein power is fed to said circuit, said circuit converting said power into power for said AC excitation.

17. The power source as recited in claim 16 wherein said generator can function as an induction motor to thereby provide mechanical power.

18. The power source as recited in claim 17 wherein external DC power can provide power to said induction motor via said circuit.

19. The power source is recited in claim 18 wherein external AC power can provide power to said induction motor via said circuit.

20. A method for producing hybrid AC/DC power, comprising the steps of:

producing uncontrolled frequency AC power by means of an induction generator;

converting said wild frequency AC power into high frequency AC power; and producing both DC and lower frequency AC power from said high frequency AC power.

* * * * *